US007599321B2

(12) United States Patent
Lee et al.

(10) Patent No.: US 7,599,321 B2
(45) Date of Patent: Oct. 6, 2009

(54) PRIORITIZATION OF CONNECTION IDENTIFIERS FOR AN UPLINK SCHEDULER IN A BROADBAND WIRELESS ACCESS COMMUNICATION SYSTEM

(75) Inventors: Jong Sheng M. Lee, Austin, TX (US); Jeffrey Keating, Austin, TX (US); Brian D. Levin, Austin, TX (US); Daniel G. Orozco Perez, Cedar Park, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 390 days.

(21) Appl. No.: 11/365,774

(22) Filed: Mar. 1, 2006

(65) Prior Publication Data

US 2007/0206545 A1    Sep. 6, 2007

(51) Int. Cl.
*H04W 4/00* (2006.01)
*H04W 72/00* (2006.01)
(52) U.S. Cl. ............... 370/320; 370/395.4; 455/450
(58) Field of Classification Search ......... 455/450–453; 370/329–337, 395.4
See application file for complete search history.

(56) References Cited

U.S. PATENT DOCUMENTS

| | | | |
|---|---|---|---|
| 2001/0038620 A1* | 11/2001 | Stanwood et al. | 370/336 |
| 2004/0185853 A1 | 9/2004 | Kim et al. | |
| 2004/0228296 A1* | 11/2004 | Lenzini et al. | 370/322 |
| 2005/0053029 A1 | 3/2005 | Lee et al. | |
| 2005/0063330 A1 | 3/2005 | Lee et al. | |
| 2005/0101328 A1 | 5/2005 | Son et al. | |

OTHER PUBLICATIONS

IEEE Standard for Local and metropolitan area networks Part 16: Air Interface for Fixed Broadband Wireless Access Systems, Oct. 1, 2004, p. i-iv.*

* cited by examiner

*Primary Examiner*—Lester Kincaid
*Assistant Examiner*—Daniel Lai
(74) *Attorney, Agent, or Firm*—Dillon & Yudell LLP

(57) ABSTRACT

An uplink access method in a mobile subscriber station of a broadband wireless access communication system prioritizes uplink bandwidth allocation according to QoS types of requested service. A scheduling priority is assigned to each type of service flow to guarantee the highest data rate for the high QoS service flows, and then the uplink data grants are scheduled based on this assigned priority. By assigning a priority to each connection based on the service type flow, the higher data rate connections will always have the opportunity to transmit uplink data to fulfill the high data rate QoS requirement, and fragmentation will occur only on the last lowest priority Connection ID (CID) based on the size of the last remaining data grant. The uplink access method further prevents the high priority service from stealing bandwidth from data grants intended for lower priority services by identifying when the data grant is mismatched from the amount requested by the lower level services.

18 Claims, 6 Drawing Sheets

PRIORITIZATION OF CONNECTION IDENTIFIERS FOR AN UPLINK SCHEDULER IN A BROADBAND WIRELESS ACCESS COMMUNICATION SYSTEM

BACKGROUND OF THE INVENTION

1. Field of the Invention

The present invention relates generally to broadband wireless access communication systems, and more particularly to methodologies in requesting and allocating uplink bandwidth according to qualities of service (QoS) in a broadband wireless access communication system.

2. Description of the Related Art

A fourth generation (4G) wireless communication system, which is a next generation communication system, is actively being designed and studied in order to provide users with multiple services having various QoS at a high transmission rate. Current third generation (3G) wireless communication systems support a transmission speed of about 384 kbps in an outdoor channel environment having a relatively unfavorable channel environment and support a maximum transmission speed of 2 Mbps in an indoor channel environment having a relatively favorable channel environment. Further, wireless local area networks (LAN) systems and wireless metropolitan area networks (MAN) systems generally support transmission speeds of 11 to 50 Mbps. Accordingly, in current 4G communication systems, research is actively being conducted to develop a new type of communication system for ensuring mobility and QoS in wireless LAN system and wireless MAN system, which support the relatively high transmission speeds and high speed services that are to be provided by the 4G communication system.

For the end user, the most important thing in broadband wireless access communication networks is satisfaction with the end-to-end services regarding the QoS. The QoS requirements are mapped to the protocol hierarchy levels. For enabling a mapping between different hierarchy levels, the QoS requirements are usually classified. The QoS requirements also have to be fulfilled connection-specific. Additionally, it should be noted that in many cases, one subscriber station may have several connections simultaneously. These connections, each identified by a unique connection identifier (CID), may originate from more than one user equipment, and they have a defined QoS, which may be different for each connection. Thus, there is a problem as to how the QoS requirements can be fulfilled for each connection.

Some 4G broadband wireless access communication systems utilize four levels of QoS: (1) Unsolicited Guaranteed Service (UGS): UGS Service needs the same bandwidth to be continuously allocated while maintaining a connection such as VoIP (Voice over Internet Protocol); (2) Real-time Packet Service (rtPS): a real-time voice transmission service has the characteristics of a real-time service like an UGS, but causes variable bandwidth allocation because the amount of generated data is different depending on the frames and conforms to video transmission; (3) Non-real-time Packet Service (nrtPS): service having no real-time service characteristics, does not have a burst characteristic as opposed to the best effort service, and conforms to an FTP (File Transfer Protocol); and (4) Best Effort (BE) having a burst characteristic, conforms to best effort services and the like, service of the lowest class, has an allocation of bandwidth in a non-assured form, allocates bandwidth only for each request (i.e., TCP/IP).

In centrally controlled access systems, capacity is typically granted subscriber station-specific. Problems may arise when the subscriber station receives an insufficient data grant among multiple connections. FIG. 1 shows a prior art example of GPSS (Grant Per Subscriber Station) operation and the problems arising from insufficient data grants in prior art broadband wireless access communication systems. The system includes a subscriber station (SS) and a base station (BS). The subscriber station has three resource requests for three separate connections 102, 104 and 106. These connections may represent connections of three single user terminals, or three connections of a single user terminal with different QoS requirements. Each connection is identified in row 108 as "CID1," CID2," and "CID3," and further indicates the type of service for each CID as UGS rtPS, nrtPS, respectively. The connections 102, 104, 106 have separate resource requests of 600, 500 and 300 bytes, respectively, as shown in row 110.

The subscriber station sends a capacity request 112 to the base station of 500 bytes for CID2 and 300 bytes for CID3, for an aggregate request of 800 bytes. A capacity request is not required for CID1 because it is under the UGS QoS, and is being provided a periodic capacity grant by the base station without the need for continuing requests. The base station decides to allocate only 600 bytes of the aggregate request of 800 bytes, and sends a resource grant message 114 granting the 600 bytes.

Upon receipt of resource grant message 114, the subscriber station allocates the 600 byte grant equally among the different connections. The subscriber station transmits a response message 116 providing updated data to the base station according to the capacity allocation decisions made by the subscriber station. Message 116 indicates that each connection was allocated 200 bytes, resulting in three separate allocation fragments. As a result, the first connection updated resource need is 400 bytes more, the second connections need is 300 bytes more, and the third connection's need is 100 bytes, as seen at row 118. This results in the subscriber station transmitting an additional resource request 120 for 300 bytes for CID2 and 100 bytes for CID3

The base station then responds by granting 1,000 bytes in message 122, which includes its periodic grant of 600 bytes to CID1 under its UGS QoS, as well as granting in-full the additionally 400 bytes requested in message 120. As seen at row 124, each of the three connections 102-106 have fully satisfied their current resource needs from the 1,000 bytes granted by the base station. However, this process has resulted in the base station granting the subscriber station 200 bytes more than is needed for the subscriber station to fulfill its uplink capacity requirements. The subscriber station responds with an update message 126 reporting that each of the connections CID1, 2 and 3 have uplinked an additional 800 bytes to the base station.

As will be appreciated, this example shows that a UGS connection can steal bandwidth from non-UGS connections based on outstanding resource requests within the subscriber station. Moreover, since the UGS type of service has guaranteed, unsolicited bandwidth allocated at periodic intervals, the UGS connection should not be allowed to steal from a solicited data grant to the non-UGS connections. Moreover, it can be seen that the re-allocation of the data grant among the various connections results in multiple fragmentations on all connections, which can be time consuming in allocating and subsequently fulfilling the resource request. Last, as was seen in the example above, such fragmentation will often result in more bandwidth being requested than is needed to fulfill the resource needs.

What is needed is a mechanism for implementing a proper schedule of all connection uplink data requests that satisfies the required QoS parameters for each connection without suffering from the aforementioned problems. The subscriber station needs to intelligently share an insufficient data grant among uplink data demands of connections, and must guarantee the high data rates needed for high QoS connections. Moreover, the subscriber station needs to institute a methodology of allocating insufficient data grants that prevents a high QoS service from stealing bandwidth granted to lower levels of QoS connections. Still further, such a methodology should minimize fragmentation to increase uplink throughput.

BRIEF DESCRIPTION OF THE DRAWINGS

This invention is described in a preferred embodiment in the following description with reference to the drawings, in which like numbers represent the same or similar elements, as follows.

In the following detailed description of exemplary embodiments of the invention, reference is made to the accompanying drawings, which form a part hereof, and in which is shown by way of illustration specific exemplary embodiments in which the invention may be practiced.

DETAILED DESCRIPTION OF PREFERRED EMBODIMENTS

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims. In particular, although the preferred embodiment is described below with respect to a particular broadband wireless communication system, it will be appreciated that the present invention is not so limited, and that it has application to a plurality of embodiments of wireless systems such as cellular, satellite, Wi-Fi, WiMAX and Ultrawideband systems, for example.

The present invention proposes uplink access methods when a mobile subscriber station requests bandwidth allocation to a base station in order to transmit data through an uplink according to QoS types of requested service in a broadband wireless access communication system. Preferred embodiments of the present invention, i.e., methods for uplink bandwidth request and allocation based on QoS classes in a broadband wireless access communication system, will be described with reference to the accompanying drawings. In the following description of the present invention, a detailed description of known functions and configurations incorporated herein will be omitted when it may obscure the subject matter of the present invention.

Figure 1:
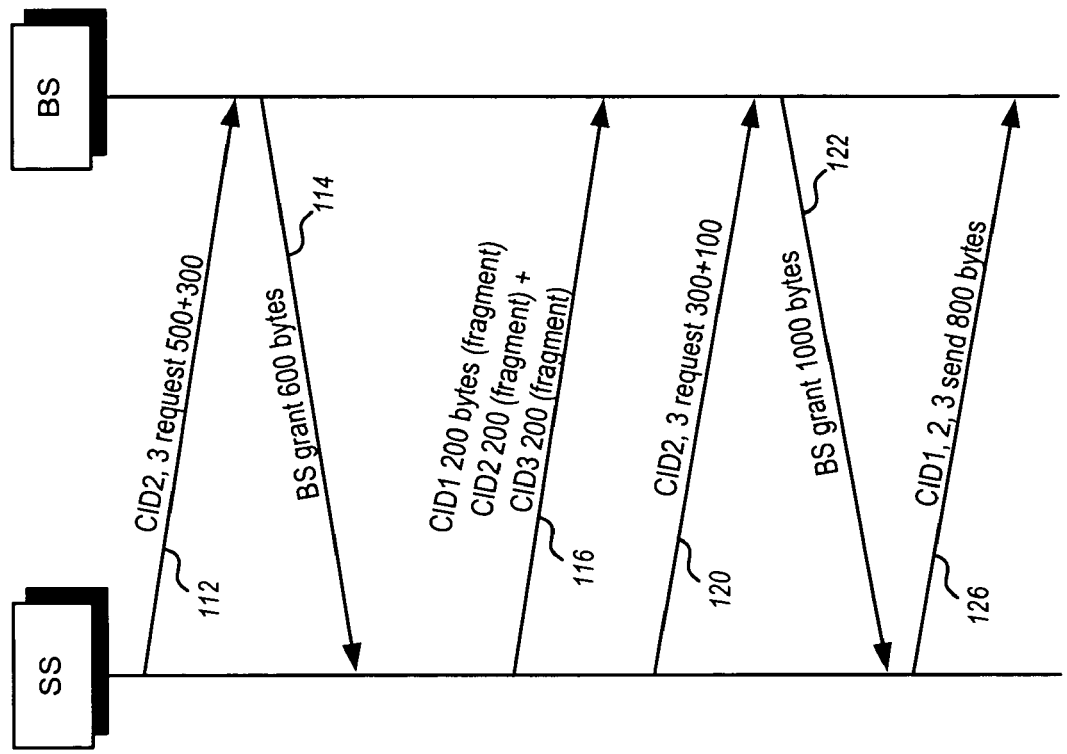
FIG. 1 shows a prior art example of GPSS (Grant Per Subscriber Station) operation and the problems arising from insufficient data grants in prior art broadband wireless access communication systems.
Figure 2:
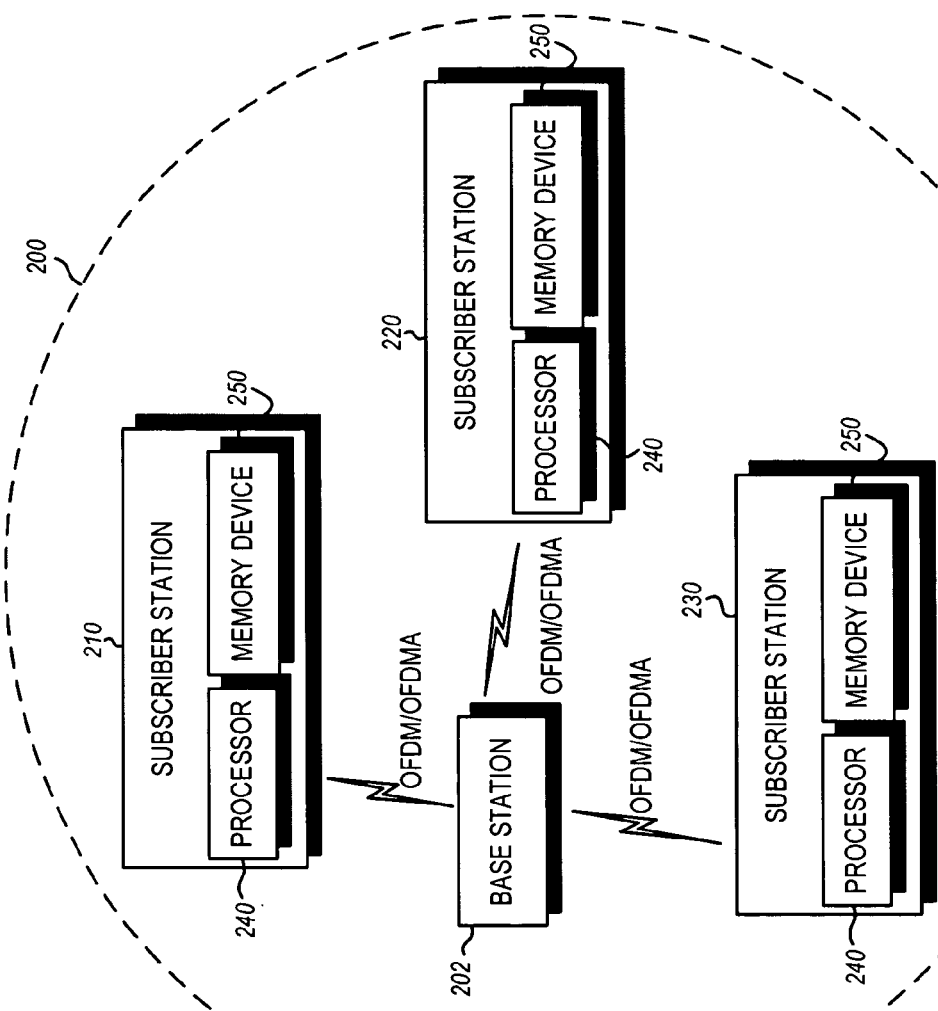
FIG. 2 shows a block diagram of a broadband wireless access communication system, in accordance with a preferred embodiment of the present invention.

With reference now to FIG. 2, there is shown a block diagram of a broadband wireless access communication system, in accordance with a preferred embodiment of the present invention. FIG. 2 illustrates a conventional broadband wireless access communication system such as an IEEE 802.16a (also known as "WiMAX") wireless access communication system, for example. An IEEE (Institute of Electrical and Electronics Engineers) 802.16a communication system applies a single carrier (SC), an OFDM scheme and an orthogonal frequency division multiple access (OFDMA) scheme to a physical channel of the wireless MAN system in order to support a broadband transmission network. Because the IEEE 802.16a communication system applies the OFDM/OFDMA scheme to the wireless MAN system, the IEEE 802.16a communication system transmits a physical channel signal using a plurality of sub-carriers, thereby making it possible to transmit high-speed data. An IEEE 802.16e communication system is achieved by supplementing the above-described IEEE 802.16a communication system to enable the mobility of a subscriber station (SS). Further, IEEE 802.16e communication systems are broadband wireless access communication systems using the OFDM/OFDMA scheme. For the convenience of explanation, however, only the IEEE 802.16a communication system will be described below as an example. The IEEE 802.16a and IEEE 802.16e communication systems can use either the OFDM/OFDMA scheme or a single carrier (SC) scheme. It is noted that a wireless MAN system is a type of broadband wireless access communication system capable of providing a wider service coverage area and a higher transmission speed than that of a wireless LAN system.

The IEEE 802.16a communication system 200 of FIG. 2 has a single cell structure and includes a base station (BS) 202 and a plurality of subscriber stations 210, 220, and 230, which are managed by the base station 202. The base station 202 communicates with the subscriber stations 210, 220, and 230 using the SC/SCa/OFDM/OFDMA scheme. Each subscriber stations 210, 220, and 230 may be any of various types of devices, including a computer system, such as a portable computer, a personal digital assistant (PDA), an Internet appliance, a communications device, or other wired or wireless device, and each contains a processor 240 and memory device 250 for storing and executing software that implements functionality on the subscriber station. A subscriber station may include various wireless or wired communication devices for communication with the base station, such as a wireless Ethernet card, paging logic, RF communication logic, Bluetooth communication logic, infrared communication circuitry, a wired Ethernet card, a modem, a DSL device, an ISDN device, an ATM device, a parallel or serial port bus interface, or other type of communication device. Each subscriber station preferably includes a processor device and a memory medium, which stores data and program instructions for execution on the processor device.

Access to the base station is carried out using a contention-based scheme. A mobile subscriber station requests bandwidth allocation to the base station in order to transmit data, that is, traffic to the base station (i.e., uplink access). According to a bandwidth allocation request of the mobile subscriber station, the base station allocates bandwidth to be used by the mobile subscriber station when there is currently available bandwidth, and notifies the mobile subscriber station of the allocated bandwidth information. According to the uplink access methods of the present invention, access methods for the bandwidth allocation request are adaptively realized according to types of service of data to be transmitted.

Figure 3:
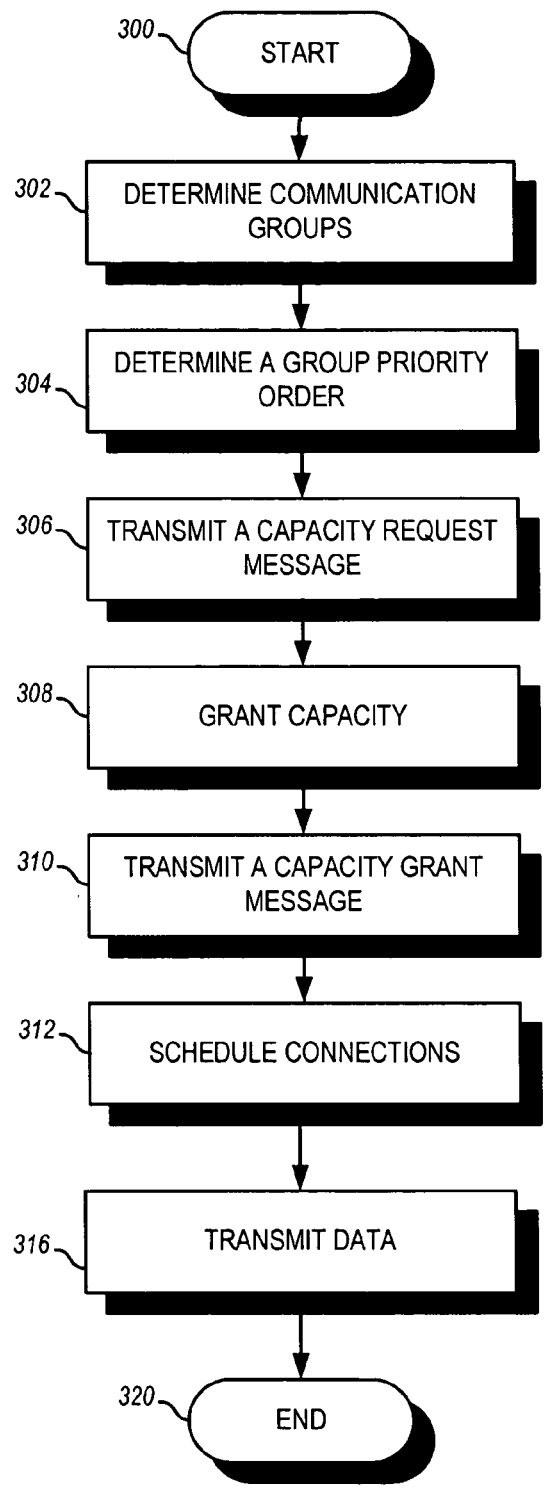
FIG. 3 shows a flow diagram of a data transmission method using scheduling services, in accordance with a preferred embodiment of the present invention.

FIG. 3 shows a flow diagram of a data transmission method using scheduling services, in accordance with a preferred embodiment of the present invention. Generally speaking, scheduling services are designed to improve the efficiency of the poll/grant process. By specifying a scheduling service and its associated QoS parameters, the base station can anticipate the throughput and latency needs of the uplink traffic and provide polls and/or grants at the appropriate times. The basic services in this example, as defined in the exemplary IEEE 802.16 standard, are Unsolicited Grant Service (UGS), Real-Time Polling Service (rtPS), Non-Real-Time Polling Service (nrtPS) and Best Effort (BE) service. Each service is intended for a specific type of data flow.

The Unsolicited Grant Service (UGS) is designed to support real-time service flows that generate fixed size data packets on a periodic basis, such as Voice over IP without silence suppression. The service offers fixed size grants on a real-time periodic basis, which eliminate the overhead and latency of SS requests and assure that grants are available to meet the flow's real-time needs.

The Real-Time Polling Service (rtPS) is designed to support real-time service flows that generate variable size data packets on a periodic basis, such as MPEG video. The service offers real-time, periodic, unicast request opportunities, which meet the flow's real-time needs and allow the SS to specify the size of the desired grant. This service requires more request overhead than the UGS, but supports variable grant sizes for optimum data transport efficiency.

The Non-Real-Time Polling Service (nrtPS) is designed to support non real-time service flows that require variable size data Grant Burst Types on a regular basis, such as high bandwidth FTP (File Transfer Protocol). The service offers unicast polls on a regular basis which assures that the flow receives request opportunities even during network congestion.

The intent of the Best Effort (BE) service is to provide efficient service for the best effort traffic. In order for this service to work correctly, the Request/Transmission Policy setting should be such that the subscriber station is allowed to use contention request opportunities.

With reference now back to FIG. 3, the method starts from block 300. In block 302 communication groups are determined based on each service available. In the example used here, the communication groups are determined on the basis of the basic services presented above. More details about scheduling services can be found in the literature and standards of the field.

In block 304, a group priority order is determined. The priority order can be determined on the basis of the previously determined communication groups or independently. In most cases, the most straightforward solution is that the order is determined on the basis of the groups themselves, especially when the groups are QoS-groups, because in that case the priority order is determined by the industry standard used (in this example, IEEE 802.16).

In block 306, at least one capacity request message is transmitted by a subscriber station, which is connection-specific. In the current example, a single capacity request message is transmitted from the subscriber station for each connection having data to be transmitted. In an alternative embodiment, a separate capacity request message is transmitted from the subscriber station for each connection having data to be transmitted. It should be noticed that capacity request messages may get lost due to collisions with transmissions from other subscriber stations.

In block 308, capacity is granted by a base station. The base station makes the decision on the capacity grant on the grounds of arrived capacity requests. However, a base station is not obliged to grant as much capacity as requested, and it can make a divergent decision. A typical situation is that subscribers need more capacity than is available at the moment and a base station divides the free capacity between different requests according to some algorithm, which is specific for example on the priority of transmissions. In block 310, at least one capacity grant message is transmitted by a base station. A grant message type is typically defined by the standard used. In block 312, connections are then scheduled by a subscriber station on the basis of the communication groups, group priority order and granted capacity in accordance with the methodology of a preferred embodiment of the present invention, which shown in detail in FIG. 4. Despite the base stations allocation of capacity among subscriber stations or connections, a subscriber station can allocate or schedule the radio capacity a base station has granted independently from the decision of a base station.

The process then proceeds to block 314, where at least one message including information on previous capacity requests is transmitted from the subscriber station. The information is, for instance, to pad the unused bytes granted. In block 316, the subscriber station transmits data to the base station according to a connection scheduling (or allocation) made by the subscriber station. Thereafter, the process ends at step 320.

According to the preferred embodiment, the subscriber station assigns a scheduled priority to each type of service flow that guarantees the highest data rate for the high QoS service flows in the subscriber station. The subscriber station pre-assigns a priority to each CID based on the CID's type of service, and then schedules the uplink data based on this assigned priority. Among the four types of service flow, the UGS service demands the highest data rate and is granted the highest priority (Priority 1), followed in priority by the rtPS service (Priority number 2), the nrtPS service (Priority 3), and the BE service (Priority 4). The subscriber station assigns the available uplink data grants to the highest priority CID first. If there are more data grants available from the current data grant, then the subscriber station assigns the remaining bandwidth to the next highest priority CID until there are no more data grants available.

Figure 4:
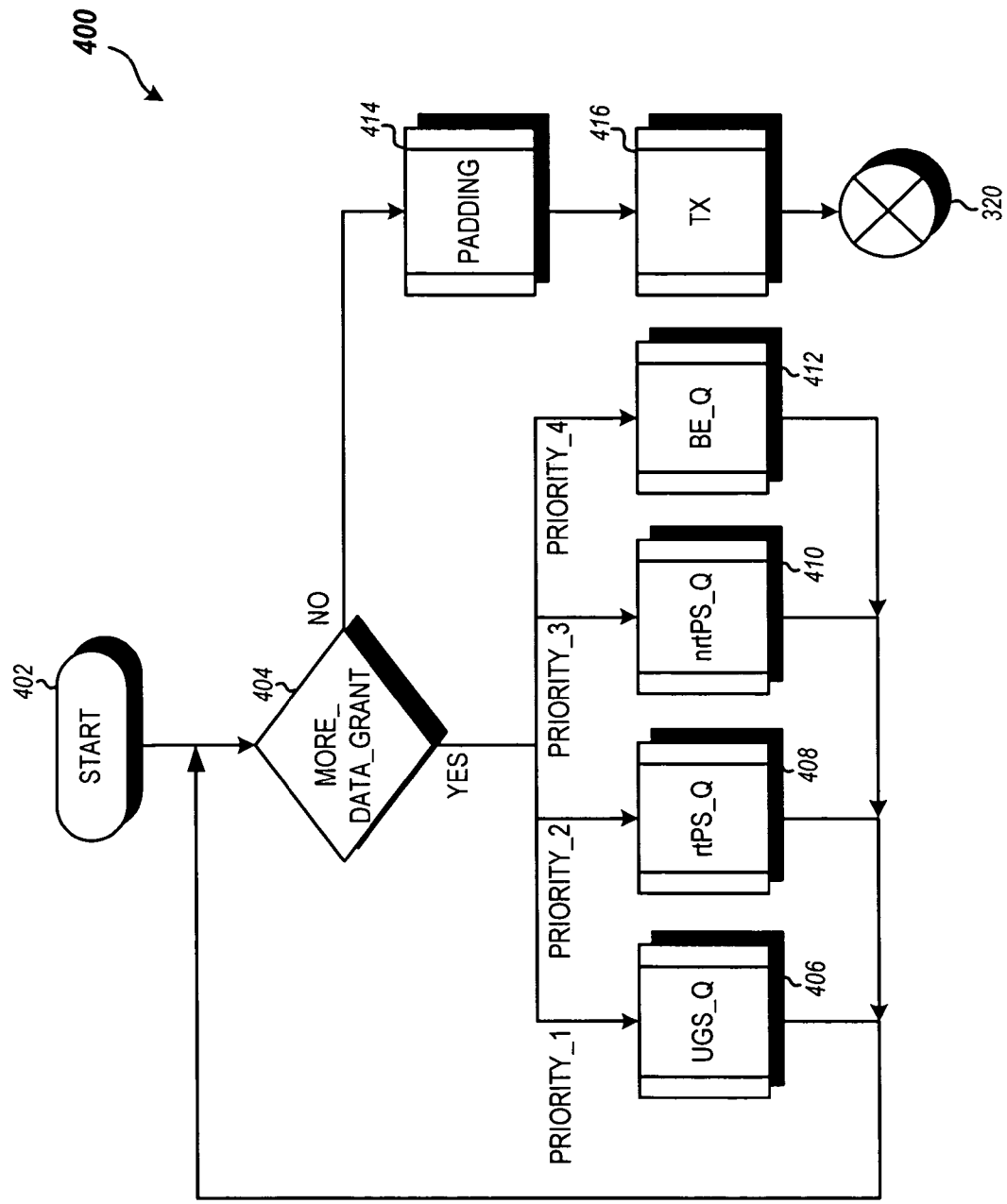
FIG. 4 shows a flow diagram of a process for assigning available uplink data grants to the highest priority connections in the subscriber station, in accordance with a preferred embodiment of the present invention.

FIG. 4 shows a flow diagram of a process for assigning available uplink data grants to the highest priority connections in the subscriber station, in accordance with a preferred embodiment of the present invention. The process 400 starts at step 402 and proceeds to decision 404 to determine if a data grant remains available among the current data grant from the base station. If so, the process proceeds to steps 406-412 to allocate the granted bandwidth based on the subscriber station's pre-assigned priorities for each class of service flow. As seen in FIG. 4, the data grant is first used to fulfill a resource request from a "Priority 1" quality of service connection at step 406. In the preferred example, the UGS quality of service has been designated as the Priority 1 service, and the data grant is used to fill bandwidth requests in the UGS queue (UGS_Q). If there are no Priority 1 requests, the data grant is used to fulfill the next lowest priority (Priority 2-Priority 4) requesting data at steps 408-412. The process then returns to step 404 to determine if additional upload data bandwidth has been granted and remains to be scheduled. If so, the process proceeds to allocate the remaining data grant among the additional priorities, first fulfilling a request at the highest priority at steps 406-412. For example, if the queue for the rtPS (rtPS_Q) has no outstanding data requests, the process will proceed to step 410 and check for any data requests nrtPS queue (nrtPS_Q) indicating the bandwidth request of the nrtPS quality of service. If so, the additional data grant will be allocated to any outstanding requests in the priority 3 service flow. The process then returns to step 404 to determine if additional data has been granted and unallocated among the priority connections. If granted data remains to be allocated and all other Priorities 1-3 have satisfied resource requests, the process proceeds to step 412 where the best efforts quality of service is granted uplink data in the BE queue (BE_Q). Thereafter, the process returns to step 404 to determine if additional data remains to be allotted or if there are no longer any resource requests to be fulfilled. If all data grants have been allotted to outstanding resource requests, the process proceeds to step 414, where uplink PDUs are padded, and thereafter transmitted to the base station at step 416. Subsequently, the process ends at step 420.

As will be appreciated, by assigning a priority to each CID based on the service type flow, the present invention guarantees the higher data rate CID will always have the opportunity to transmit uplink data to fulfill the high data rate QoS requirement. Without prioritizing the CIDs based on the service type mechanism, the prior art subscriber station will not know which CID has been granted the uplink opportunity and may assign the data grant to a lower priority data rate CID, forcing the higher data rate CID to not meet its specified QoS parameters.

A further advantage of the preferred embodiment is that the subscriber station will only fragment the last lowest priority CID based on the size of the last remaining data grant. As will be appreciated, this results in only a single fragmented connection, rather than the multiple fragmented connections resulting from a non-prioritized subscriber station scheduling methodology, which costs time and resource.

Figure 5:
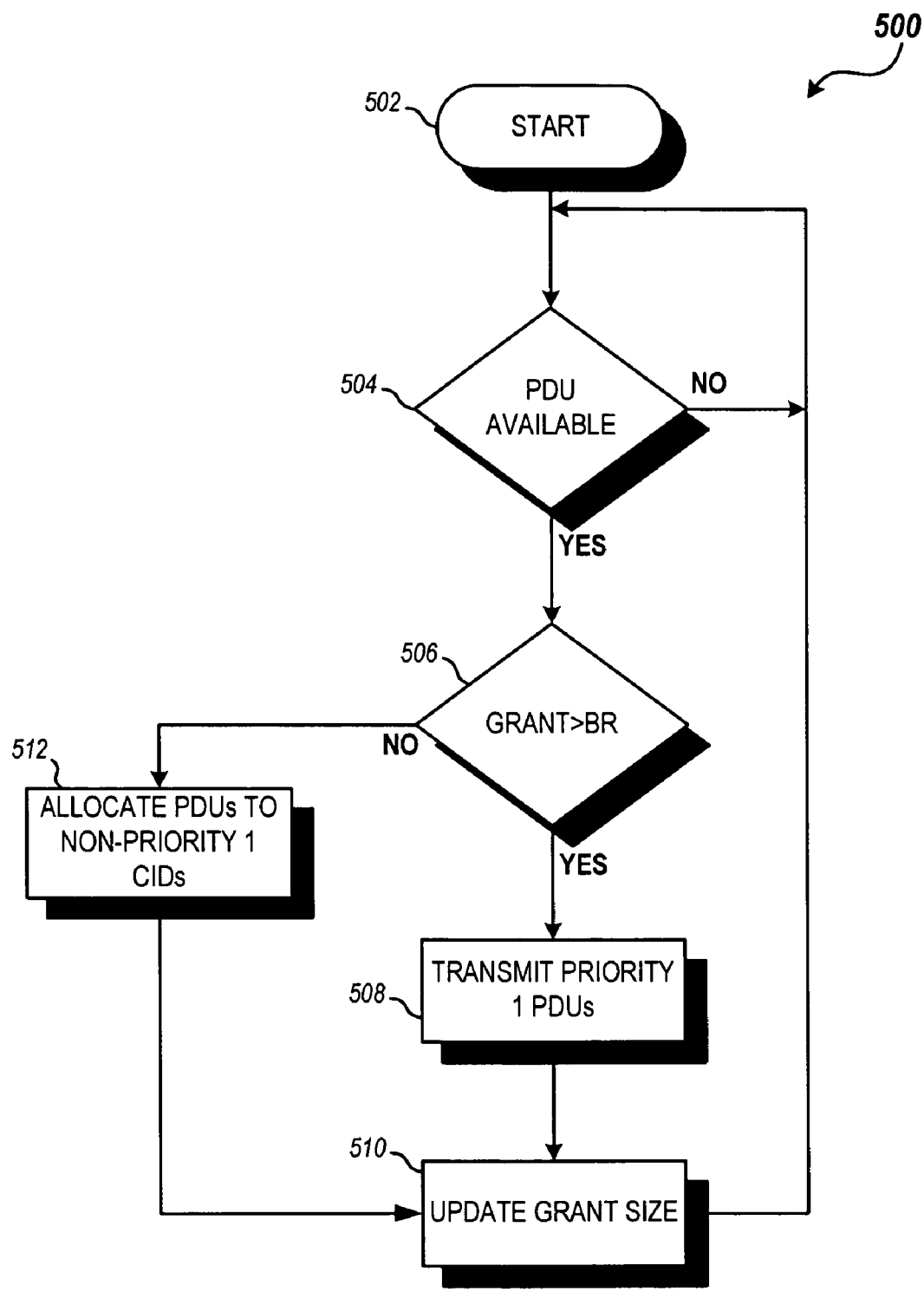
FIG. 5 shows a flow diagram of the process for protecting higher priority connections from bandwidth stealing from lower priority connections, in accordance with a preferred embodiment of the present invention.

With reference now to FIG. 5, there is shown a flow diagram of the process for protecting higher priority connections from bandwidth stealing from lower priority connections, in accordance with a preferred embodiment of the present invention. The process 500 starts at step 502, and proceeds to decision 504, where the subscriber station identifies whether a PDU has been granted and is available for uplink to the base station. If the base station has not made any data grants, the process waits at step 504. If a PDU is available for uplink, the process proceeds to decision block 506, where the subscriber station determines if the data grant from the base station is greater than the current aggregate bandwidth requests from lower priority CIDs (BR). In a preferred embodiment, decision 506 determines if the currently outstanding bandwidth requests by non-UGS CIDs is less than the current data grant. If the current data grant is not greater than the previously requested uplink size from non-UGS CIDs, then the process proceeds to step 512, where Priority 1 UGS requests (step 406 of process 400) are bypassed and the data grant is allocated to lower level non-UGS Priorities 2-4 (steps 408-412 of process 400). Because the data grant is less than the bandwidth requested by non-UGS CIDs, the base station was not granting PDUs to the UGS service under its periodic allocation. Therefore, according to the preferred embodiment, the scheduling service prevents the UGS service from stealing bandwidth from the data grant to the lower level services.

Alternatively, if the decision at step 506 of process 500 is that the data grant is greater than the current aggregate bandwidth requests from lower priority CIDs (BR), it is presumed that the data grant includes the periodically granted higher level priority uplink PDUs (UGS data grant) from the base station. Accordingly, all PDUs for the priority 1 class of service (UGS) are transmitted at step 508. The process proceeds to step 510, where the subscriber station updates the grant size for the high priority (UGS) CID. Thereafter, the process returns to step 504 to determine if additional uplink PDUs have been made available by the base station. As will be appreciated, process 500 permits the subscriber station to manage the high priority (UGS) queue to prevent bandwidth stealing by the high priority service.

Figure 6:
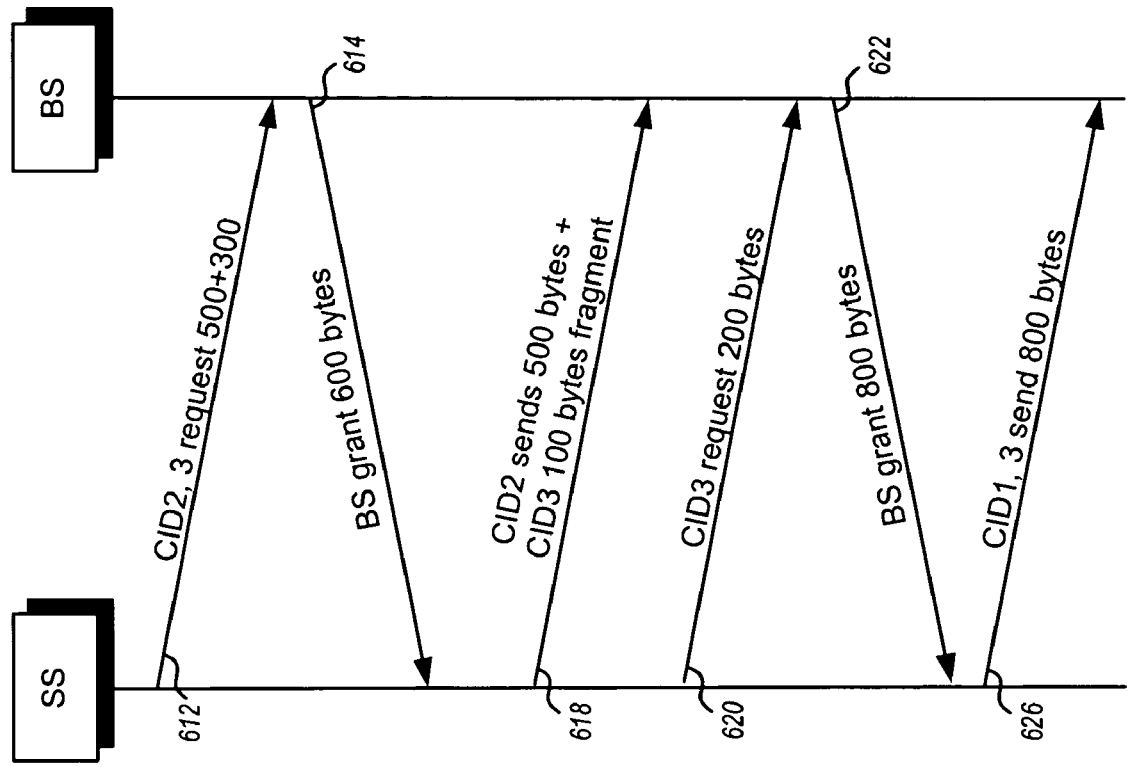
FIG. 6 shows an example of a methodology for prioritizing subscriber station connection IDs in an uplink scheduler of a subscriber station, in accordance with a preferred embodiment of the present invention.
Figure 6:
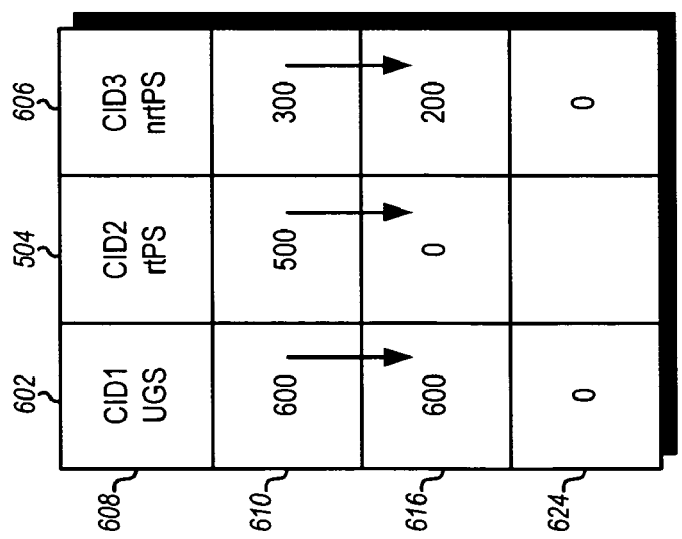

With reference now to FIG. 6, there is shown an example of a methodology for prioritizing subscriber station CIDs in an uplink scheduler of a subscriber station, in accordance with a preferred embodiment of the present invention. The system includes a subscriber station (SS) and a base station (BS). Connections between the subscriber station and base station are identified in row 608 as a CID1, CID2 and CID3 for columns 602, 604, 606, respectively. These identifiers may represent connections of three user terminals or three separate connections of a single user terminal with different quality requirements. CID1 is a UGS-type service flow, CID2 is an rtPS-type service flow, and CID3 is an nrtPS-type service flow. The subscriber station has three resource requests in row 610 for each of the three separate connections 602, 604, 606, respectively. As seen in row 610, CID1 has requested 600 bytes, CID2 has requested 500 bytes, and CID3 has requested 300 bytes.

The subscriber station sends a capacity request 612 of 500 bytes for CID2 and 300 bytes for CID3 for a total of 800 bytes. The base station responds by allocating 600 bytes to the subscriber station and sending a grant message 614 granting the 600 bytes. Upon receipt of the grant message 614, the subscriber station detects that the data grant is less than the previously requested 800 bytes from the non-UGS. In accordance with the process 500, the subscriber station will not schedule a UGS CID to any PDUs, and instead will assign the 800 bytes to the non-UGS connections CID2 and CID3. In accordance with steps 408-412 of process 400, the subscriber station will allocate the capacity based on the pre-assigned priorities by first fulfilling the request for 500 bytes from the rtPS (Priority 2) connection CID2 and then allocating the remaining 100 bytes to the next priority nrtPS (Priority 3) connection CID3. Row 616 shows CID2 being assigned its entire requirement of 500 bytes, leaving CID3 with a updated resource request of 200 bytes, and CID1, having not stolen any bandwidth from the allocated grant, retaining its resource request of 600 bytes.

Thereafter, the subscriber station reports to the base station with an update message 618 that CID2 is sending 500 bytes and CID3 is sending 100 bytes as a fragment. Subsequently, the subscriber station sends a second resource request 620 requesting 200 bytes for CID3 to fulfill its remaining uplink request.

The base station then responds with a capacity grant message 622 granting 800 bytes. The subscriber station determines that the capacity grant is greater than the bandwidth request from the non-UGS connections (i.e., the aggregate updated resource request is 200 bytes from CID3) and concludes, in accordance with process 500, that the capacity grant includes uplink bandwidth for the UGS connection.

Accordingly, the subscriber station assigns 600 bytes to CID1, bringing its resource request to zero, as shown at row 624, and assigns the remaining 200 bytes to CID3, bringing its resource request down to zero, as shown in row 624. The subscriber station then responds to the base station with an update message 626 informing that CID1 and CID3 are uplinking the 800 bytes allocated.

With reference to the above example of the operation of a preferred embodiment of the present invention, it will be appreciated that a significant number of disadvantages seen in the prior art have been overcome by the present invention. First, the UGS connection does not steal bandwidth from the non-UGS CIDs. Second, only a single fragmentation occurs on the last partially fulfilled CID. Third, only a single bandwidth request is required in the next frame for the fragmented PDUs. As a result, the communication channel capacity is more efficiently utilized by reducing the number of fragmentation and bandwidth request messaging, as well as avoiding an inefficient mismatch of bandwidth requested and allocated.

As will be appreciated, the processes in preferred embodiments of the present invention may be implemented using any combination of computer programming software, firmware or hardware. As a preparatory step to practicing the invention in software, the program logic such as computer programming code (whether software or firmware) or computer data to be compiled or interpreted by an software engine (a Java Virtual Machine, for example) according to a preferred embodiment will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

While the invention has been particularly shown and described with reference to preferred embodiments, it will be understood by those skilled in the art that various changes in form and detail may be made therein without departing from the spirit and scope of the invention. Any variations, modifications, additions, and improvements to the embodiments described are possible and may fall within the scope of the invention as detailed within the following claims.

What is claimed is:

1. A data transmission method in a wireless communication system, the wireless communication system comprising at least one base station and at least one subscriber station coupled by a plurality of wireless connections, wherein the at least one subscriber station allocates granted capacity for the plurality of wireless connections, the method comprising:
    determining a priority order for the plurality of wireless connections, wherein determining a priority order includes classifying a high-priority connection and one or more low-priority connections from among the plurality of wireless connections;
    transmitting from a subscriber station at least one capacity request message requesting bandwidth for the one or more low-priority connections from among the plurality of wireless connections;
    receiving a capacity grant message from the base station granting capacity to the plurality of wireless connections; and
    allocating the granted capacity among the plurality of wireless connections based on the priority order, including:
        (a) if the granted capacity in the capacity grant message is equal to or less than the aggregate bandwidth requested for the one or more low-priority connections in the at least one capacity request message, allocating granted capacity among the one or more low-priority connections based on their priority order and not allocating any granted capacity to the high-priority connection; and
        (b) if the granted capacity in the capacity grant message is greater than the aggregate bandwidth requested for the one or more low-priority connections in the at least one capacity request message, allocating the granted capacity among the high-priority connection and one or more low-priority connections based on priority order.

2. The method of claim 1, wherein the at least one capacity request message is requesting bandwidth for the one or more low-priority connections.

3. The method of claim 1, wherein priority order is determined based on connection quality demands.

4. The method of claim 1, wherein the step of determining priority order comprises prioritizing the plurality of wireless connections based on a service class for each connection of the plurality of wireless connections, selected from among Unsolicited Grant Service, Real-Time Polling Service, Non-Real Time Polling Service and Best Effort Service.

5. The method of claim 1, wherein the step of allocating granted capacity comprises allocating granted capacity to a higher-priority connection if the granted capacity is greater than the capacity requested in the capacity request message.

6. The method of claim 1, further comprising the step of transmitting data on one or more of the plurality of wireless connections from the subscriber station to base station based on the allocated granted capacity.

7. The method of claim 1, wherein the wireless communication system operates in accordance with the IEEE 802.16 protocol.

8. The method of claim 1, wherein the wireless communication system operates in accordance with OFDM/OFDMA/SC/SCa.

9. A subscriber station of a wireless communication system, wherein the subscriber station allocates capacity for connections between the subscriber station and a base station, the subscriber station comprising:
    means for determining a priority order for the plurality of wireless connections, wherein determining a priority order includes classifying a high-priority connection and one or more low-priority connections from among the plurality of wireless connections;
    means for transmitting from a subscriber station at least one capacity request message requesting bandwidth for the one or more low-priority connections from among the plurality of wireless connections;
    means for receiving a capacity grant message from the base station granting capacity to the plurality of wireless connections; and means for allocating the granted capacity among the plurality of wireless connections based on the priority order, including:
- (a) if the granted capacity in the capacity grant message is equal to or less than the aggregate bandwidth requested for the one or more low-priority connections in the at least one capacity request message, allocating granted capacity among the one or more low-priority connections based on their priority order and not allocating any granted capacity to the high-priority connection; and
- (b) if the granted capacity in the capacity grant message is greater than the aggregate bandwidth requested for the one or more low-priority connections in the at least one capacity request message, allocating the granted capacity among the high-priority connection and one or more low-priority connections based on priority order.

10. An article of manufacture comprising machine-readable medium including program logic embedded therein for causing a device to perform the steps of:

determining a priority order for a plurality of wireless connections coupling at least one base station and a subscriber station in a wireless communication system, wherein the at least one subscriber station allocates granted capacity for the plurality of wireless connections, wherein determining a priority order includes classifying a high-priority connection and one or more low-priority connections from among the plurality of wireless connections;

transmitting from a subscriber station at least one capacity request message requesting bandwidth for the one or more low-priority connections from among the plurality of wireless connections;

receiving a capacity grant message from the base station granting capacity to the plurality of wireless connections; and allocating the granted capacity among the plurality of wireless connections based on the priority order, including:
- (a) if the granted capacity in the capacity grant message is equal to or less than the aggregate bandwidth requested for the one or more low-priority connections in the at least one capacity request message, allocating granted capacity among the one or more low-priority connections based on their priority order and not allocating any granted capacity to the high-priority connection; and
- (b) if the granted capacity in the capacity grant message is greater than the aggregate bandwidth requested for the one or more low-priority connections in the at least one capacity request message, allocating the granted capacity among the high-priority connection and one or more low-priority connections based on priority order.

11. The article of manufacture of claim 10, wherein the at least one capacity request message is requesting bandwidth for the one or more low-priority connections.

12. The article of manufacture of claim 10, wherein priority order is determined based on connection quality demands.

13. The article of manufacture of claim 10, wherein the step of determining priority order comprises prioritizing the plurality of wireless connections based on a service class for each connection of the plurality of wireless connections, selected from among Unsolicited Grant Service, Real-Time Polling Service, Non-Real Time Polling Service and Best Effort Service.

14. The article of manufacture of claim 10, wherein the step of allocating granted capacity comprises allocating granted capacity to a higher-priority connection if the granted capacity is greater than the capacity requested in the capacity request message.

15. The article of manufacture of claim 10, further comprising the step of transmitting data on one or more of the plurality of wireless connections from the subscriber station to base station based on the allocated granted capacity.

16. The article of manufacture of claim 10, wherein the wireless communication system operates in accordance with the IEEE 802.16 protocol.

17. The article of manufacture of claim 10, wherein the wireless communication system operates in accordance with OFDM/OFDMA/SC/SCa.

18. The article of manufacture of claim 10, wherein the device is a subscriber station.

* * * * *